April 21, 1925.
A. J. LACKSTROM
1,534,222
VEHICLE DIRECTION INDICATOR
Filed July 30, 1924
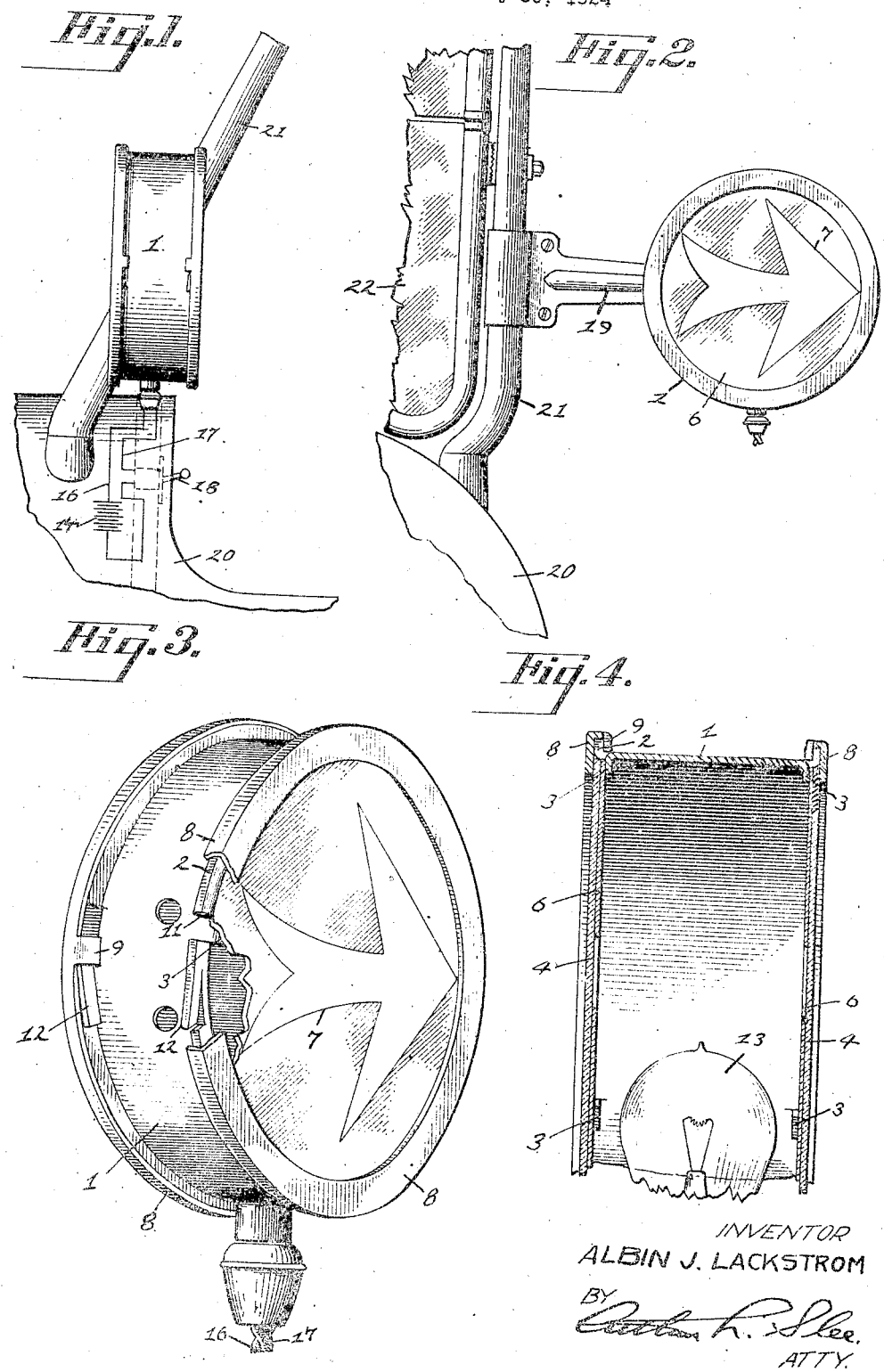
INVENTOR
ALBIN J. LACKSTROM
BY
ATTY.

Patented Apr. 21, 1925.

1,534,222

UNITED STATES PATENT OFFICE.

ALBIN J. LACKSTROM, OF OAKLAND, CALIFORNIA.

VEHICLE DIRECTION INDICATOR.

Application filed July 30, 1924. Serial No. 729,197.

*To all whom it may concern:*

Be it known that I, ALBIN J. LACKSTROM, a citizen of the United States, residing in the city of Oakland and county of Alameda and State of California, have invented a new and useful Improvement in Vehicle Direction Indicators, of which the following is a specification.

My invention relates to improvements in direction indicators for automobiles and the like and particularly to an improved signal adapted to be mounted upon the side of an automobile to indicate the direction of a proposed turn to persons either in front or in back of the automobile.

The primary object of my invention is to provide an improved direction indicator whereby a single signal serves to warn persons both in front and in back of an automobile of a proposed turn.

Another object is to provide an improved construction which will facilitate and cheapen the manufacture and which will form a compact and effective signal.

A further object is to provide a device which may be readily mounted upon the automobile and which will not disfigure the appearance of the automobile.

I accomplish these and other objects by means of the device disclosed in the drawings forming a part of the present specification wherein like characters of reference are used to designate similar parts throughout said specification and drawings and in which, Fig. 1 is a side elevation of the signal as applied upon the side of an automobile, and including a conventional wiring diagram of the electrical connections.

Fig. 2 is a front elevation of the device as shown in Fig. 1.

Fig. 3 is a broken perspective of the signal upon a somewhat larger scale, parts being broken away to show the structure.

Fig. 4 is a broken vertical section of the signal.

Referring to the drawings the numeral 1 is used to designate a cylindrical signal housing open at both ends thereof. Outwardly turned flanges 2 are formed upon the ends of the housing. Lugs 3 are cut from the flanges 2 and turned inwardly to form backing elements adapted to limit the inward movement of transparencies mounted within the open ends of the housing, said transparencies consisting of transparent plates 4 and masks 6 associated with the plates and bearing arrows 7 arranged to be rendered visible in a manner hereinafter more fully explained.

The transparencies are held within the ends of the housing 1 and against the lugs 3 by means of rims 8 detachably engaging the flanges 2 of the housing, said rims being provided with inwardly turned retaining lugs 9 adapted to be moved into engagement with the flanges 2 through gaps 11 resulting from the downward turning of the lugs 3 from said flanges. Locking lugs 12 are laterally offset from the flanges 2 adjacent the gaps 11, and arranged to be engaged by the lugs 9 to lock the rims 8 in position upon the housing 1 when the rims are rotated upon the housing to move the lugs 9 away from the gaps 11.

A lighting element 13 is mounted within the housing 1 to illuminate the transparencies, said lighting element being connected to a source of electrical energy such as the storage battery 14 of the automobile through connections 16 and 17. A suitable switch 18 is connected into one of the connections 16 or 17 whereby the circuit through the lighting element may be controlled at the will of the operator.

The housing is arranged to be connected to a supporting arm or bracket 19 adapted to be secured upon the side of an automobile 20, the bracket being preferably clamped or otherwise secured upon the supporting post 21 of the windshield 22 so as to extend outwardly from the side of the automobile whereby the signal may be observed either from in front or in back of the automobile.

In operation, a single signal housing is mounted upon the left hand side of the automobile, the arrows 7 of both the front and rear transparencies being arranged to point outwardly from the automobile. The circuit through the lighting element 13 is normally broken at the switch 18 so that the lighting element is not energized. When it is desired to signal a proposed turn toward the left, the switch 18 is operated to close the circuit through the lighting element 13 which is thereby energized to illuminate the transparencies. The illumination of the transparencies renders the outwardly directed arrows 7 clearly visible to persons either in front or in back of the automobile whereby such persons may be apprised of the intended turn.

By providing transparencies in both front and back of the housing, the single signal is sufficient to warn persons both in front and back of the automobile. For all ordinary purposes a single signal placed upon the left side of the automobile is sufficient as it is only when making a left turn that a signal is necessary to the safety of the driver or others. This is true for the reason that when making a right hand turn the driver naturally drives close to the right hand side of the street and in making the turn there is no danger either to approaching vehicles or vehicles passing from the rear. In making the left hand turn however, the machine must cross the course of approaching machines, and also of machines which, unless warned, might attempt to pass from the rear, and for this reason a signal upon the left side of the automobile which will warn persons both in front and in back of the automobile is essential for safety.

The particular structure above described forms an important part of the present invention because of the economy with which it may be manufactured and assembled. By striking the lugs 3 and 12 from the flanges 2 of the housing, a one-piece housing structure is obtained which may be manufactured very cheaply and upon which the transparencies may be readily mounted by means of the removable rims 8. The entire device may be easily mounted upon a convenient portion of the automobile and when so mounted is of such a neat and compact structure as not to disfigure the appearance of the automobile.

Having thus described my invention what I claim as new and desire to secure by Letters Patent is,

1. A vehicle direction indicator comprising a cylindrical housing open at both ends; outwardly turned flanges formed upon the ends of the housing; a lighting element mounted within the housing and arranged to be connected to a source of electrical energy; transparencies mounted within the open ends of the housing, said transparencies bearing outwardly directed arrows visible from in front or rear of the automobile to indicate the direction of a proposed turn; lugs cut from the flanges and turned inwardly to form backing elements for the transparencies and to form gaps in said flanges; and rims detachably engaging the flanges to hold the transparencies against the lugs, said rims having retaining lugs movable into engagement with the flanges through the gaps formed therein.

2. A vehicle direction indicator comprising a cylindrical housing open at both ends; outwardly turned flanges formed upon the ends of the housing; a lighting element mounted within the housing and arranged to be connected to a source of electrical energy; transparencies mounted within the open ends of the housing, said transparencies bearing outwardly directed arrows visible from in front or rear of the automobile to indicate the direction of a proposed turn; lugs cut from the flanges and turned inwardly to form backing elements for the transparencies and to form gaps in said flanges; rims detachably engaging the flanges to hold the transparencies against the lugs, said rims being provided with retaining lugs movable into engagement with the flanges; through the gaps formed therein; and locking lugs laterally offset from the flanges to be engaged by the retaining lugs of the rim to lock said rim in engagement with the flange.

3. A vehicle direction indicator comprising a cylindrical housing open at both ends; outwardly turned flanges formed upon the ends of the housing; a lighting element mounted within the housing and arranged to be connected to a source of electrical energy; transparencies mounted within the open ends of the housing, said transparencies consisting of transparent plates and masks mounted in back of the plates and bearing outwardly directed arrows visible from in front or rear of the automobile to indicate the direction of a proposed turn; lugs cut from the flanges and turned inwardly to form backing elements for the transparencies and to form gaps in the flanges; rims detachably engaging the flanges to hold the transparencies against the lugs, said rims being provided with retaining lugs movable into engagement with the flanges through the gaps formed therein; and locking lugs laterally offset from the flanges adjacent the gaps to be engaged by the retaining lugs of the rim to lock said rims in engagement with the flanges.

In witness whereof I hereunto set my signature.

ALBIN J. LACKSTROM.